(12) United States Patent
Sato et al.

(10) Patent No.: US 8,157,271 B2
(45) Date of Patent: Apr. 17, 2012

(54) FLOATING CHUCK MECHANISM

(75) Inventors: Hisataka Sato, Toyota (JP); Naomasa Mukaide, Kariya (JP); Masayuki Takeshima, Kariya (JP); Takashi Matsui, Toyoake (JP)

(73) Assignee: JTEKT Corporation, Osaka-shi (JP)

( * ) Notice: Subject to any disclaimer, the term of this patent is extended or adjusted under 35 U.S.C. 154(b) by 975 days.

(21) Appl. No.: 12/030,519

(22) Filed: Feb. 13, 2008

(65) Prior Publication Data

US 2008/0238002 A1 Oct. 2, 2008

(30) Foreign Application Priority Data

Mar. 30, 2007 (JP) ................................. 2007-091857

(51) Int. Cl.
*B23B 31/08* (2006.01)
*B23B 31/36* (2006.01)

(52) U.S. Cl. ........................................ 279/132; 279/133

(58) Field of Classification Search .................. 279/132, 279/16, 17, 133, 139; 82/151, 903, 142
See application file for complete search history.

(56) References Cited

U.S. PATENT DOCUMENTS

| 2,524,468 | A | | 10/1950 | Ouimette | |
|---|---|---|---|---|---|
| 3,344,695 | A | * | 10/1967 | Hohwart | 82/165 |
| 4,215,605 | A | * | 8/1980 | Toth et al. | 82/165 |
| 5,074,177 | A | * | 12/1991 | Schmidt | 82/165 |
| 6,824,142 | B2 | * | 11/2004 | Meissner et al. | 279/133 |
| 2006/0213339 | A1 | * | 9/2006 | Bailer et al. | 82/152 |

FOREIGN PATENT DOCUMENTS

| DE | 10 2005 030 820 B3 | 8/2006 |
|---|---|---|
| EP | 1 596 082 A2 | 11/2005 |
| JP | 04-151019 A | 5/1992 |
| JP | 04-219526 A | 8/1992 |
| JP | 5-93710 | 12/1993 |
| JP | 11-254214 | 9/1999 |
| JP | 2003-145326 | 5/2003 |
| JP | 2003136313 A * | 5/2003 |

* cited by examiner

*Primary Examiner* — Daniel Howell
*Assistant Examiner* — Paul M Janeski
(74) *Attorney, Agent, or Firm* — Oblon, Spivak, McClelland, Maier & Neustadt, L.L.P.

(57) ABSTRACT

A floating chuck mechanism provided at a workhead that is arranged at a processing apparatus for sandwiching a cylindrical-shaped workpiece by means of two center members along a rotational axis, the floating chuck mechanism causing the workpiece to rotate about the rotational axis and correcting an eccentricity between the rotational axis and a center of an outer diameter of the workpiece, includes a chuck body portion including plurality of clamp jaws for holding the workpiece from the outer peripheral side thereof, and a chuck base portion fixed to the workhead so as to rotate therewith, the chuck base portion including a fixed portion fixed to the workhead and a slide portion slidable along a slide surface perpendicular to the rotational axis. The chuck body portion is fixed to the slide portion and sliding along the slide surface so as to correct the eccentricity.

3 Claims, 5 Drawing Sheets

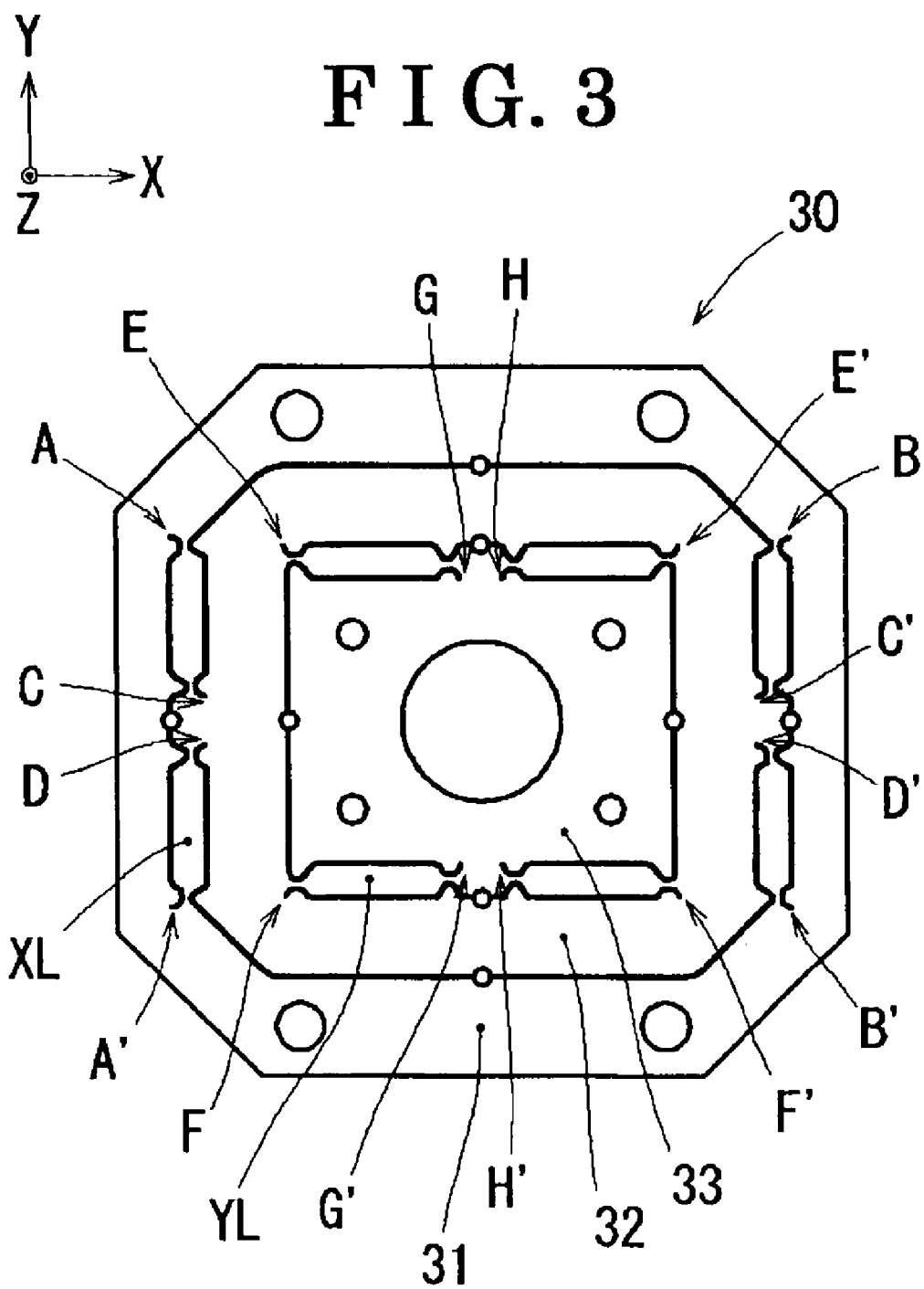

(No movement)

(Move in X-axis direction)

(Move in Y-axis direction)

(Move in X-axis direction)

(Move in Y-axis direction)

US 8,157,271 B2

FLOATING CHUCK MECHANISM

CROSS REFERENCE TO RELATED APPLICATIONS

This application is based on and claims priority under 35 U.S.C. §119 to Japanese Patent Application No. 2007-091857, filed on Mar. 30, 2007, the entire content of which is incorporated herein by reference.

FIELD OF THE INVENTION

This invention generally relates to a floating chuck mechanism. More particularly, this invention pertains to a floating chuck mechanism for clamping a workpiece provided at a processing apparatus that holds and processes the workpiece.

BACKGROUND

Various types of floating chuck mechanisms have been proposed. For example, in the cases where a workpiece is supported and held between a pair of center members of a processing machine such as a cylindrical grinding machine so that the workpiece is driven to rotate, an eccentricity (i.e., misalignment) between a center of a workpiece holding portion (i.e., clamp jaws that press and sandwich the workpiece from a direction perpendicular to a rotational axis of the workpiece) and a rotational axis of both the center members (that sandwich the workpiece from a rotational axis direction thereof) is corrected by means of the clamp jaws (i.e., clamp jaw portion) serving as center misalignment correcting means. For example, JP2003-145326A discloses a floating chuck mechanism in which clamp jaws (i.e., clamp jaw portion) are attached to a diaphragm that can float in a radial direction thereof. The clamp jaws automatically perform a centripetal movement because of a return deformation of the diaphragm. In addition, JP11-254214A discloses a floating chuck in which each clamp jaw (i.e., clamp jaw portion) is driven by a hydraulic cylinder so that force for holding a workpiece is prevented from decreasing by means of centrifugal force even at a time of high speed rotation of the workpiece. Further, JP5-93710U discloses a floating chuck in which clamp jaws (i.e., clamp jaw portion) perform a centripetal movement by means of a swing arm and a spring.

According to the floating chuck mechanism disclosed in JP2003-145326A, the clamp jaw portion performs the automatic centripetal movement. A diameter of the workpiece that can be supported or held by the clamp jaw portion is determined on the basis of a movable area of the diaphragm. Thus, the chuck (that is equipped with the clamp jaw portion) used for processing a workpiece having a large diameter cannot be used for processing a workpiece having a small diameter and in such a case, the chuck should be replaced. In addition, according to the floating chuck disclosed in JP11-254214A, the clamp jaw portion also automatically performs the centripetal movement. The clamp jaws are driven by the hydraulic cylinder mechanism so as to meet a wide range of a target diameter of a workpiece, however, such structure is complicated. Further, according to the floating chuck disclosed in JP5-93710U, the clamp jaw portion automatically performs the centripetal movement by means of the swing arm. However, in this case, the clamp jaws only support a workpiece having a limited range diameter. Thus, the chuck (that is equipped with the clamp jaw portion) used for processing a workpiece having a large diameter cannot be used for processing a workpiece having a small diameter and in such a case, the chuck should be replaced. Furthermore, according to structures of the floating chuck mechanisms disclosed in JP2003-145326A and JP5-93710U, respectively, the force for holding a workpiece by the clamp jaw portion is uneven, which may lead to a distortion of the workpiece.

Thus, a need exists for a floating chuck mechanism in which a clamp jaw portion can meet a wide range diameter of a workpiece and which has a simple structure.

SUMMARY OF THE INVENTION

According to an aspect of the present invention, a floating chuck mechanism provided at a workhead that is arranged at least one of axial end sides of a processing apparatus for sandwiching a cylindrical-shaped workpiece by means of two center members from both the axial end sides along a rotational axis on which the center members are arranged so as to face each other, the floating chuck mechanism causing the workpiece to rotate about the rotational axis while holding the workpiece from an outer peripheral side thereof and correcting an eccentricity between the rotational axis and a center of an outer diameter of the workpiece, includes a chuck body portion including plurality of clamp jaws for holding the workpiece from the outer peripheral side thereof, and a chuck base portion fixed to the workhead so as to rotate therewith, the chuck base portion including a fixed portion fixed to the workhead and a slide portion slidable along a slide surface perpendicular to the rotational axis. The chuck body portion is fixed to the slide portion and sliding along the slide surface so as to correct the eccentricity.

BRIEF DESCRIPTION OF THE DRAWINGS

The foregoing and additional features and characteristics of the present invention will become more apparent from the following detailed description considered with reference to the accompanying drawings, wherein:

FIG. 3 is an explanatory view illustrating an example of a structure of a chuck base portion according to the embodiment of the present invention;

DETAILED DESCRIPTION

Figure 1:
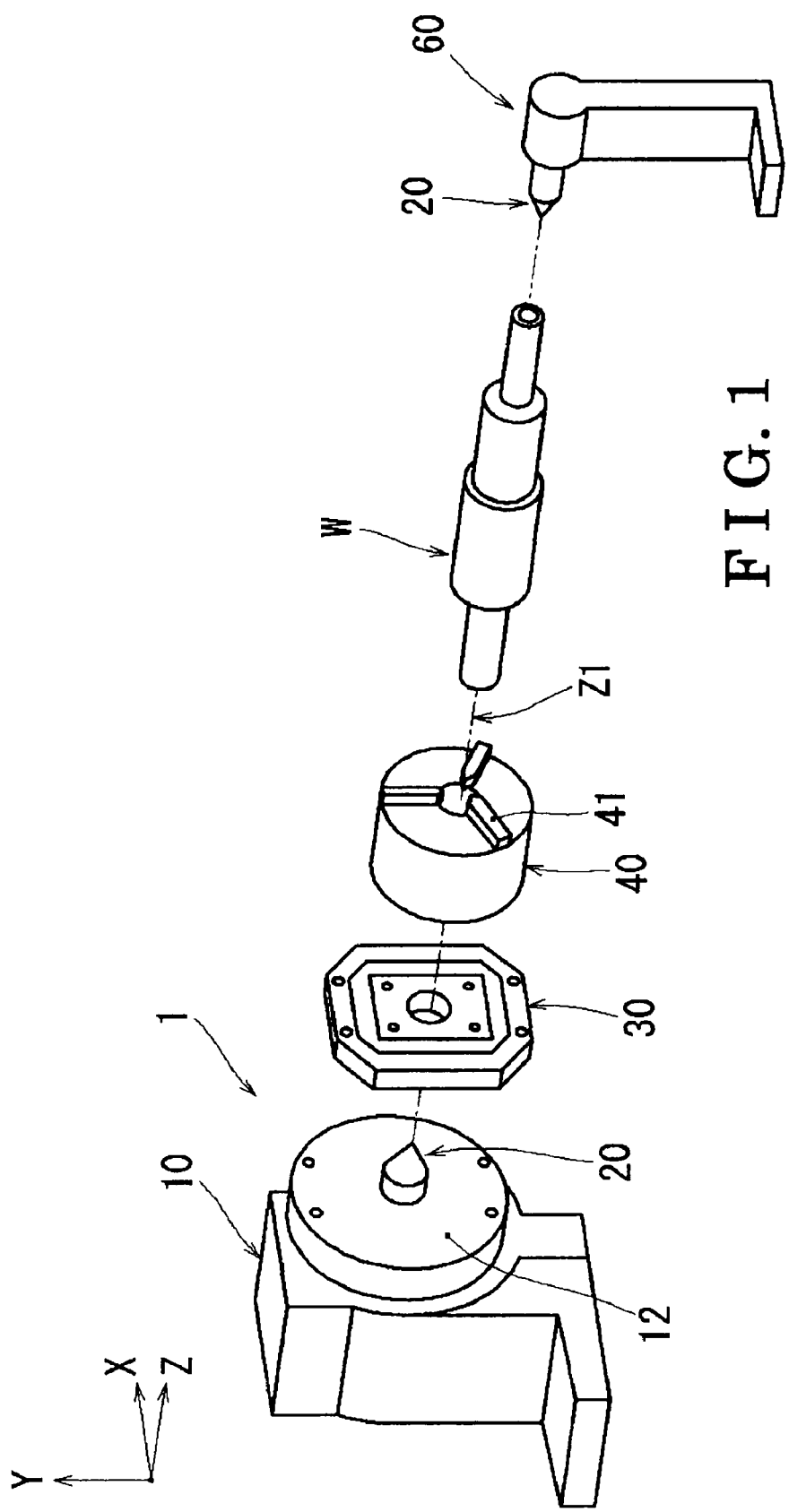
FIG. 1 is an exploded perspective view illustrating a workhead unit of a processing machine according to an embodiment of the present invention.

An embodiment of the present invention will be explained with reference to the attached drawings. FIG. 1 is an exploded perspective view illustrating a workhead unit 1 of a processing apparatus including a floating chuck mechanism. In FIG. 1, an X-axis, a Y-axis, and a Z-axis are perpendicular to one another, which is also applicable to the other drawings. The X-axis and the Z-axis both indicate a horizontal direction while the Y-axis indicates a vertical direction. In addition, the Z-axis indicates a direction of a rotational axis Z1.

The workhead unit 1 includes a workhead stand 10 fixed to a base of the processing apparatus, for example, and a workhead 12 rotatable about the rotational axis Z1. A pair of center members 20 is coaxially arranged with the rotational axis Z1 of the workhead 12 for the purposes of holding (i.e., sandwiching) a workpiece W. In addition, a chuck body portion 40 is assembled onto a chuck base portion 30 that is fixed to the workhead 12. The chuck base portion 30 and the chuck body portion 40 include through-holes, respectively, that are coaxial with the rotational axis Z1 and into both of which one of the center members 20 and the workpiece W are inserted. The chuck body portion 40 includes multiple clamp jaws 41 for holding and sandwiching the workpiece W from its outer peripheral side (i.e., in a direction perpendicular to the rotational axis Z1. In this case, however, a direction tilting from the perpendicular direction is acceptable).

In FIG. 1, one of the center members 20 is adapted to be fixed to the workhead stand 10. That is, the center member 20 is inserted into a through-hole formed at the workhead 12 and is settled, without rotating with the workhead 12. In addition, the other one of the center members 20 is adapted to be fixed to a tailstock 60 without rotating. According to the floating chuck mechanism of the present embodiment, the pair of center members 20 is necessarily provided for sandwiching the workpiece W from its axially both ends. In this case, the pair of center members 20 may be either rotatable or settled. That is, both of the center members 20 may be rotatable, or both of the center members 20 may be settled. For example, in the cases where both of the center members 20 are settled, one of the center members 20 is provided at the workhead while the other one of the center members 20 is provided (precisely, fixed) at the tailstock as illustrated in FIG. 1. Alternatively, both of the center members 20 are provided at the workheads, respectively. In the cases where both of the center members 20 are rotatable, one of the center members 20 is provided (precisely, fixed) at the workhead while the other one of the center members 20 is provided at the tailstock (i.e., the center member is not driven and is made to idle in association with the rotation of the workpiece W). Alternatively, both of the center members 20 are provided (i.e., fixed) at the workheads, respectively. The pair of center members 20 is arranged so as to face each other on the rotational axis Z1 and to hold the workpiece W from its both axial ends along the rotational axis Z1. Then, the workpiece W is supported or sandwiched in its outer peripheral direction (i.e., in a direction perpendicular to the rotational axis Z1, in this case, however, a direction tilting from the perpendicular direction is acceptable) by the clamp jaws 41 of the chuck body portion 40. The workhead 12 that is rotatable and the chuck body portion 40 that holds the workpiece W cause the workpiece W to rotate about the rotational axis Z1.

Figure 2A:
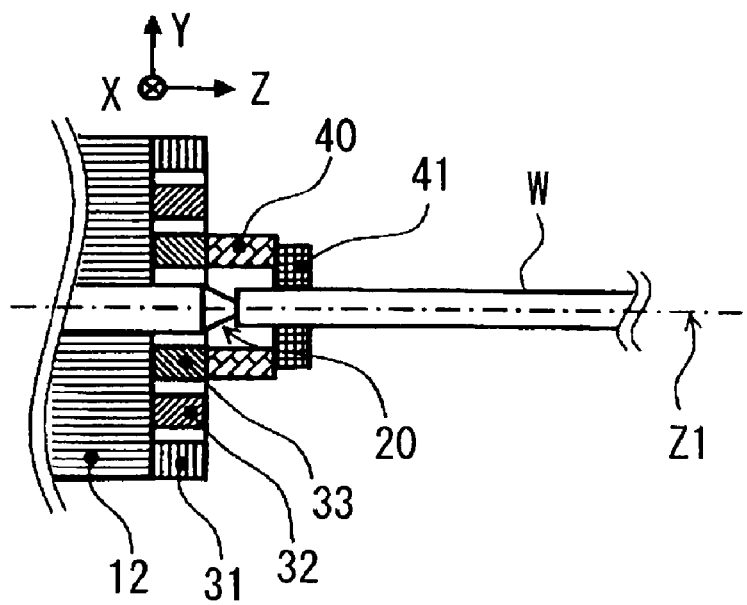
FIGS. 2A and 2B are cross-sectional views each illustrating a state in which a chuck body portion performs a centripetal movement relative to center members according to the embodiment of the present invention.
Figure 2B:
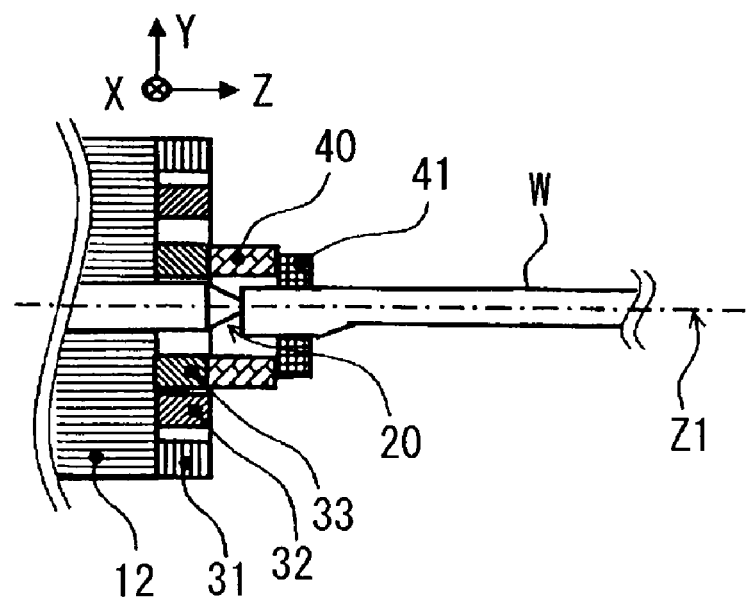

In this case, engagement bores are formed at respective axial ends of the workpiece W and into which the center members 20 are inserted, respectively. Each of the engagement bores is positioned with high precision relative to a rotational center of the workpiece W. The clamp jaws 41 hold and support the workpiece W at an outer periphery (i.e., holding portion). In the cases where an external dimension of the holding portion of the workpiece W is highly accurate and a center of an outer diameter of the workpiece W and a rotational center of the workhead 12 (i.e., rotational axis Z1) match each other as illustrated in FIG. 2A, the center members 20 and the chuck body portion 40 are coaxially arranged with each other on the rotational axis Z1. On the other hand, in the cases where the external dimension of the holding portion of the workpiece W is less accurate and the center of the outer diameter of the workpiece W and the rotational center of the workhead 12 (i.e., rotational axis Z1) are prevented from matching each other as illustrated in FIG. 2B, the center members 20 and the chuck body portion 40 are prevented from being coaxially arranged with each other on the rotational axis Z1. According to the floating chuck mechanism, even when the centers of the workpiece W and the workhead 12 are not aligned with each other as mentioned above, the workpiece W can be held or supported by the clamp jaws 41.

According to a conventional floating chuck mechanism such as disclosed in JP2003-145326A, JP11-254214A, and JP5-93710U, clamp jaws move so as to correct the center misalignment (i.e., eccentricity). The clamp jaws are able to hold the workpiece as well as to correct the misalignment of the centers. Thus, a structure of the floating chuck mechanism is complicated and the clamp jaws can only support or hold a workpiece having a limited range diameter. According to the floating chuck mechanism of the present embodiment, the chuck body portion 40 including the clamp jaws 41, instead of merely the clamp jaws 41, moves so as to correct the center misalignment. As a result, structures of the clamp jaws 41 and the chuck body portion 40 are simplified and a general-purpose chuck body portion 40 can be obtained to thereby hold a workpiece having a wide range diameter by means of the clamp jaws 41.

A structure of the chuck base portion 30 will be explained with reference to FIG. 3. The chuck base portion 30 illustrated in FIG. 3 is made of a plate member having a predetermined thickness and including multiple cuts (which are penetrating through the plate member) AA', BB', CC', DD', EE', FF', GG', and HH'. The cut AA' is formed from a start point A to an end point A'. In the same way, the other cuts are formed from respective start points to respective end points. The cuts AA' to HH' are not connected to one another. The cuts AA', BB', CC', and DD' are formed by means of a laser processing machine, for example, to thereby constitute a workhead fixed area 31 (i.e., fixed portion). In the same way, the cuts EE', FF', GG', and HH' are formed by means of a laser processing machine, for example, to thereby constitute a horizontal swing area 32 (i.e., sliding portion) and a vertical swing area 33 (i.e., sliding portion). According to the chuck base portion 30 illustrated in FIG. 3, the workhead fixed area 31 and the horizontal swing area 32 are connected to each other via four horizontal parallel link mechanisms XL (i.e., parallel link mechanism). In the same way, the horizontal swing area 32 and the vertical swing area 33 are connected to each other via four vertical parallel link mechanisms YL (i.e., parallel link mechanism). The workhead fixed area 31 includes a fitting bore by means of which the workhead 12 is mounted onto the workhead fixed area 31. In addition, the vertical swing area 33 includes a fitting bore by means of which the chuck body portion 40 is mounted onto the vertical swing area 33.

Figure 4A:
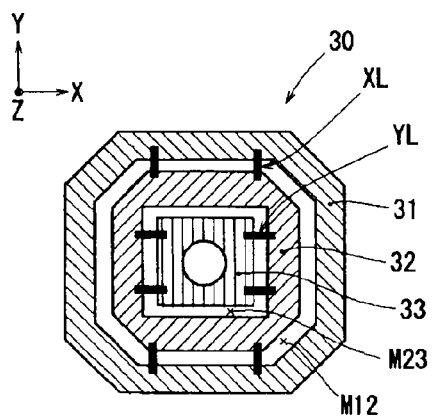
FIGS. 4A to 4E are explanatory views each illustrating an operation of the chuck base portion.

An operation of the chuck base portion 30 will be explained with reference to FIGS. 4A to 4E. Since the chuck base portion 30 includes the aforementioned structure, the horizontal swing area 32 is slidable in a horizontal direction (i.e., X-axis direction in FIGS. 4A to 4E) relative to the workhead fixed area 31. In addition, the vertical swing area 33 is slidable in a vertical direction (i.e., Y-axis direction in FIGS. 4A to 4E) relative to the horizontal swing area 32. The sliding operations of the horizontal swing area 32 and the vertical swing area 33 will be explained with reference to FIGS. 4A to 4C. FIG. 4A illustrates the chuck base portion 30 which is sliding in neither the horizontal direction nor the vertical direction. The workhead fixed area 31 and the horizontal swing area 32 are separated from each other by means of a groove M12 and are connected to each other by means of the horizontal parallel link mechanisms XL. Further, the horizontal swing area 32 and the vertical swing area 33 are separated from each other by means of a groove M23 and are connected to each other by means of the vertical parallel link mechanisms YL.

Figure 4B:
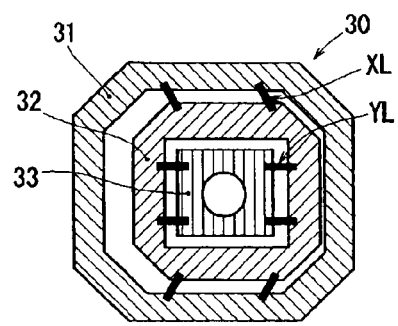
Figure 4C:
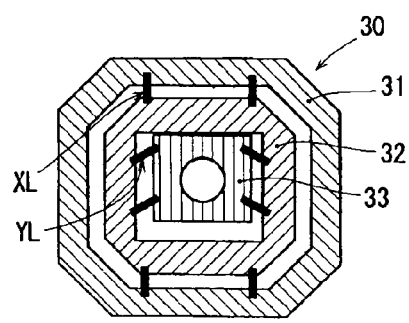
Figure 4D:
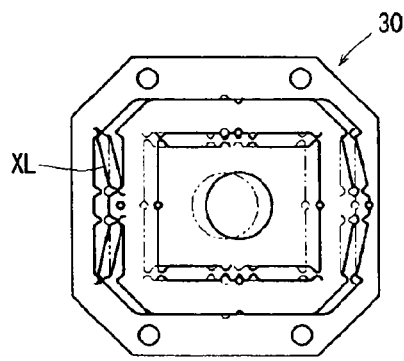
Figure 4E:
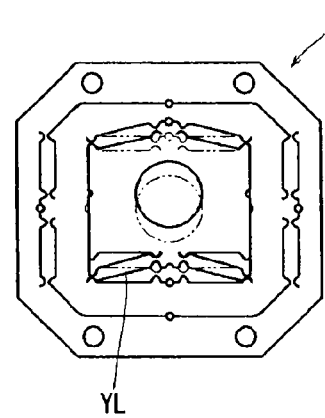

In the cases where the vertical swing area 33 to which the chuck body portion 40 is attached slides in the horizontal direction relative to the workhead fixed area 31, the vertical swing area 33 is operated by means of the horizontal parallel link mechanisms XL as in FIG. 4B. This operation is also illustrated in FIG. 4D which has a same form as in FIG. 3. Further, in the cases where the vertical swing area 33 slides in the vertical direction relative to the workhead fixed area 31, the vertical swing area 33 is operated by means of the vertical parallel link mechanisms YL as in FIG. 4C. This operation is also illustrated in FIG. 4E which has a same form as in FIG. 3. Accordingly, the vertical swing area 33 is slidable relative to the workhead fixed area 31 in the X-axis direction (i.e., horizontal direction) and the Y-axis direction (i.e., vertical direction) along a surface perpendicular to the rotational axis Z1 (i.e., slide surface) that is parallel to the Z-axis direction.

Figure 5:
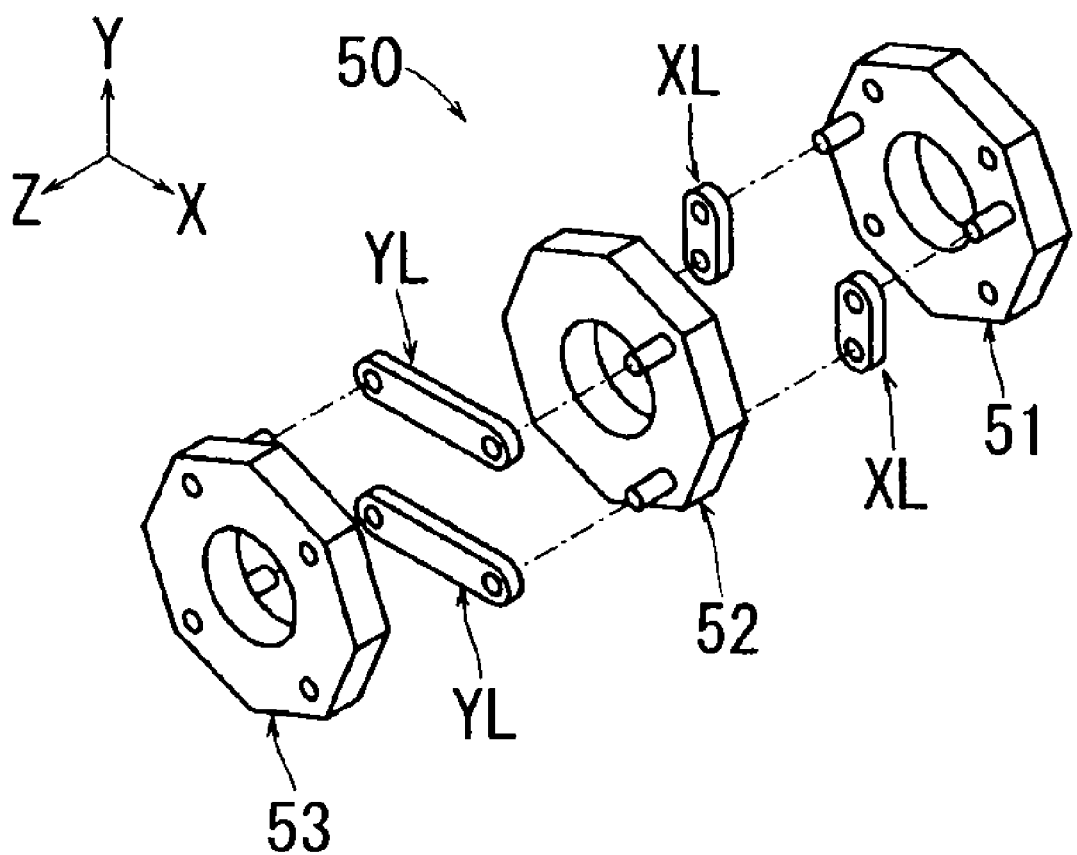
FIG. 5 is an exploded perspective view illustrating another example of a structure of the chuck base portion.

The structure of the chuck base portion 30 is not limited to that illustrated in FIG. 3 and the other structure may be considered. For example, a chuck base portion 50 illustrated in FIG. 5 includes a workhead fixed member 51 (i.e., fixed portion), a horizontal swing member 52 (i.e., slide portion), and a vertical swing member 53 (i.e., slide portion) all of which are connected in the Z-axis direction (i.e., direction of the rotational axis Z1). Pins formed at the workhead fixed member 51 on a side facing the horizontal swing member 52 engage with bores formed at the respective horizontal parallel link mechanisms XL. Pins formed at the horizontal swing member 52 on a side facing the workhead fixed member 51 engage with bores formed at the respective horizontal parallel link mechanisms XL. In the same way, pins formed at the horizontal swing member 52 on a side facing the vertical swing member 53 engage with bores formed at the respective vertical parallel link mechanisms YL. Pins formed at the vertical swing member 53 on a side facing the horizontal swing member 52 engage with bores formed at the respective vertical parallel link mechanisms YL. According to the chuck base portion 50 having the aforementioned structure, the horizontal swing member 52 is slidable in the horizontal direction (i.e., X-axis direction) relative to the workhead fixed member 51. Further, the vertical swing member 53 is slidable in the vertical direction (i.e., Y-axis direction) relative to the horizontal swing member 52.

Accordingly, the workhead fixed area 31 (or the workhead fixed member 51) of the chuck base portion 30 (or the chuck base portion 50) is attached to the workhead 12 while the chuck body portion 40 is attached to the vertical swing area 33 (or the vertical swing member 53) to thereby bring the chuck body portion 40 to be slidable along the slide surface perpendicular to the rotational axis Z1. Then, the chuck body portion 40 including the clamp jaws 41, instead of merely the clamp jaws 41, can be brought to automatically perform a centripetal movement so as to correct the center misalignment. Further, the general-purpose chuck body portion 40 having a wide range of a clamp diameter such as a collet chuck can be obtained. The chuck base portion 30 (or the chuck base portion 50) has a high rigidity in a rotational direction on the rotational axis Z1.

Next, an operation of the aforementioned floating chuck mechanism will be explained. First, the workpiece W including a holding portion of which an outer diameter center is eccentric with the rotational axis Z1 is held by the pair of center members 20, i.e., sandwiched between the center members 20. In this case, both the center members 20 are positioned on the rotational axis Z1. Then, a clamp operation is started by the clamp jaws 41 in the following way. That is, an outer diameter portion of the holding portion positioned close to the clamp jaws 41 makes contact with the clamp jaws 41 to thereby cause the vertical swing area 33 (or the vertical swing member 53) where the chuck body portion 40 is attached to start a sliding movement in the horizontal direction and the vertical direction. The chuck body portion 40 performs the centripetal movement so as to complete the clamp operation of the workpiece W. Since the clamp jaws 41 do not include a complicated structure for the centripetal movement, the force for holding the workpiece W by the clamp jaws 41 is uniform to thereby avoid possible distortion of the workpiece W, and the like. According to the floating chuck mechanism of the present embodiment, an occurrence of distortion of the workpiece W may be prevented and a high processing thereof may be achieved. In addition, because of a simple structure, the floating chuck mechanism with a low-cost and high reliability may be achieved. Further, the clamp jaws 41 can support and hold a workpiece having a wide range diameter to thereby address variations or differences in the external diameter of the holding portion of the workpiece. As a result, the floating chuck mechanism does not need to be replaced depending on the diameter of the workpiece.

The floating chuck mechanism according to the aforementioned embodiment is also applicable to various types of industrial machines in which the workpiece W is supported by both the center members 20.

According to the aforementioned embodiment, the chuck body portion 40 including the clamp jaws 41, instead of merely the clamp jaws 41, performs the centripetal movement. Thus, a range of the diameter of the workpiece that can be held by the clamp jaws 41 and a range of the centripetal movement are not related to each other. The chuck body portion 40 to which the wide range diameter of a workpiece is applicable is attached to the chuck base portion 30.

Further, according to the aforementioned floating chuck mechanism, the chuck base portion 30 is made of a plate member including multiple cuts AA', BB', CC', DD', EE', FF', GG', and HH' so that the workhead fixed area 31, the horizontal slide area 32, the vertical slide area 33, and the parallel link mechanisms XL and YL for connecting the workhead fixed area 31 and the slide areas 31 and 32 in such a manner that the slide areas 31 and 32 are slidable relative to the workhead fixed area 31 along the slide surface are formed within the slide surface.

As a result, the structure of the chuck base portion 30 can be simplified.

Still further, according to the aforementioned floating chuck mechanism, the chuck base member 50 includes the workhead fixed member 51, the horizontal swing member 52, the vertical swing member 53, and the parallel link mechanisms XL and YL that are constituted so as to be slidable along the slide surface, all of which are connected in a direction of the rotational axis Z1.

As a result, the structure of the chuck base portion 30 can be further simplified.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A floating chuck mechanism provided at a workhead that is arranged at at least one of axial ends of a processing apparatus for sandwiching a cylindrical-shaped workpiece by means of two center members from both the axial ends along a rotational axis on which the center members are arranged so as to face each other, the floating chuck mechanism causing the workpiece to rotate about the rotational axis while holding the workpiece from an outer peripheral side thereof and correcting an eccentricity between the rotational axis and a center of an outer diameter of the workpiece, comprising:

a chuck body portion including plurality of clamp jaws for holding the workpiece from the outer peripheral side thereof;

a chuck base portion fixed to the workhead so as to rotate therewith, the chuck base portion including a fixed portion fixed to the workhead and a slide portion slidable relative to the fixed portion in a direction perpendicular to the rotational axis along a slide surface extending in directions having components perpendicular and parallel to the rotational axis; and the chuck body portion being fixed to the slide portion and movable therewith along the slide surface so as to correct the eccentricity, wherein said slide portion comprises a first slide portion slidable relative to the fixed portion in a first direction perpendicular to the rotational axis, and a second slide portion slidable relative to the fixed portion and relative to the first slide portion, in a second direction perpendicular to the rotational axis and to the first direction.

2. A floating chuck mechanism provided at a workhead that is arranged at at least one of axial ends of a processing apparatus for sandwiching a cylindrical-shaped workpiece by means of two center members from both the axial ends along a rotational axis on which the center members are arranged so as to face each other, the floating chuck mechanism causing the workpiece to rotate about the rotational axis while holding the workpiece from an outer peripheral side thereof and correcting an eccentricity between the rotational axis and a center of an outer diameter of the workpiece, comprising:

a chuck body portion including plurality of clamp jaws for holding the workpiece from the outer peripheral side thereof;

a chuck base portion fixed to the workhead so as to rotate therewith, the chuck base portion including a fixed portion fixed to the workhead and a slide portion slidable along a slide surface perpendicular to the rotational axis; and the chuck body portion being fixed to the slide portion and movable along the slide surface so as to correct the eccentricity, wherein the chuck base portion is made of a plate member including plurality of cuts so that the fixed portion, the slide portion, and a parallel link mechanism for connecting the fixed portion and the slide portion in such a manner that the slide portion is slidable relative to the fixed portion along the slide surface are formed within the slide surface.

3. A floating chuck mechanism provided at a workhead that is arranged at at least one of axial ends of a processing apparatus for sandwiching a cylindrical-shaped workpiece by means of two center members from both the axial ends along a rotational axis on which the center members are arranged so as to face each other, the floating chuck mechanism causing the workpiece to rotate about the rotational axis while holding the workpiece from an outer peripheral side thereof and correcting an eccentricity between the rotational axis and a center of an outer diameter of the workpiece, comprising:

a chuck body portion including plurality of clamp jaws for holding the workpiece from the outer peripheral side thereof;

a chuck base portion fixed to the workhead so as to rotate therewith, the chuck base portion including a fixed portion fixed to the workhead and a slide portion slidable along a slide surface perpendicular to the rotational axis; and the chuck body portion being fixed to the slide portion and movable along the slide surface so as to correct the eccentricity, wherein the chuck base portion includes the fixed portion, the slide portion, and a parallel link mechanism that is constituted so as to be slidable along the slide surface, all of which are connected in a direction of the rotational axis.

* * * * *